No. 847,647. PATENTED MAR. 19, 1907.
A. N. CALKINS.
GASOLENE ENGINE TRUCK.
APPLICATION FILED APR. 16, 1906.
2 SHEETS—SHEET 1.
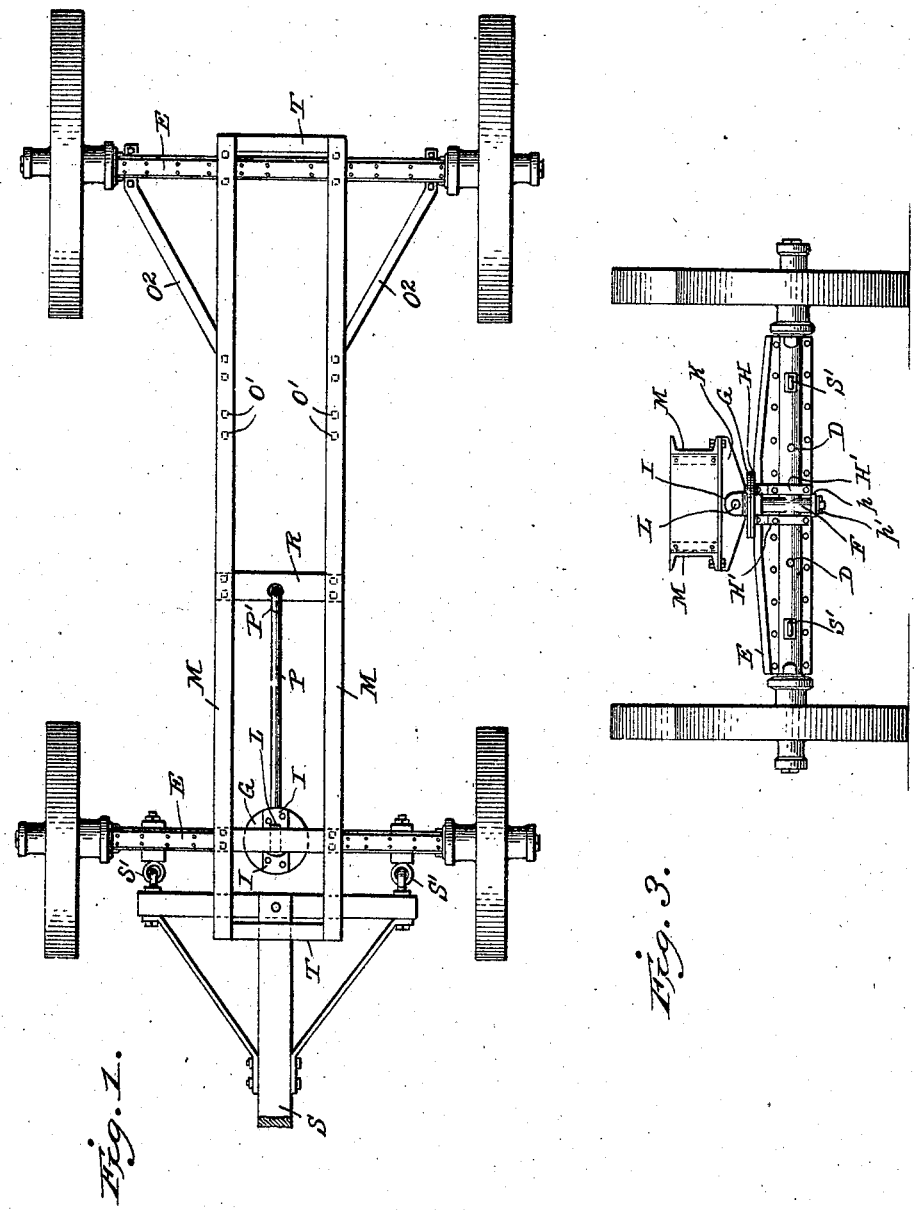
Witnesses
Edwin L. Yewell
Thomas Durant
Inventor
Addison N. Calkins
By Church & Church
his Attorneys No. 847,647. PATENTED MAR. 19, 1907.
A. N. CALKINS.
GASOLENE ENGINE TRUCK.
APPLICATION FILED APR. 16, 1906.
2 SHEETS—SHEET 2.
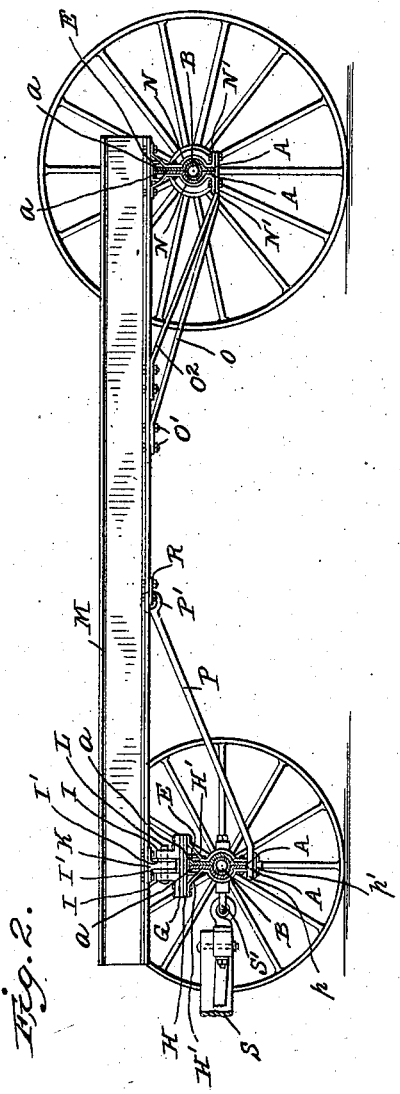
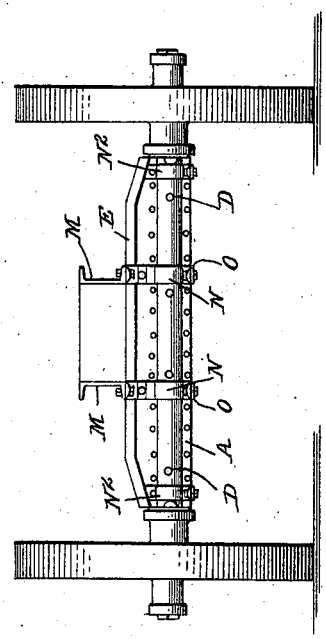
Witnesses
Edwin L. Jewell
Thomas Durant
Inventor
Addison N. Calkins,
By
his Attorneys

UNITED STATES PATENT OFFICE.

ADDISON N. CALKINS, OF QUINCY, ILLINOIS.

GASOLENE-ENGINE TRUCK.

No. 847,647.        Specification of Letters Patent.        Patented March 19, 1907.

Application filed April 16, 1906. Serial No. 312,002.

*To all whom it may concern:*

Be it known that I, ADDISON N. CALKINS, a citizen of the United States, residing at Quincy, in the county of Adams and State of Illinois, have invented certain new and useful Improvements in Gasolene-Engine Trucks, of which the following is a full, clear, and exact description thereof, reference being had to the accompanying drawings, forming part of this specification, and to the figures and letters of reference marked thereon.

This invention relates to improvements in trucks designed more especially for the transportation of gasolene-engines, such as are used in various agricultural pursuits and as a substitute for portable steam-engines, the object of the invention being to provide a truck embodying in its construction a rigid platform upon which the engine and its fittings may be mounted and which will not be distorted and strained during transportation over roadways of rough or uneven contour.

A further object of the invention is to provide a truck of simple and strong design well calculated to withstand the rough usage and vibrations to which it is of necessity subjected.

Referring to the accompanying drawings, Figure 1 is a top plan view of a gasolene-engine truck embodying the present improvements. Fig. 2 is a side elevation with the near wheels removed and the axles in section. Fig. 3 is a front elevation with the tongue removed, and Fig. 4 is a rear elevation of the truck.

Like letters of reference in the several figures indicate the same parts.

The front and rear axles of the truck each embodies in its construction two pressed-steel plates A A, flanged outwardly at their upper edges at *a a* and pressed outwardly along substantially central lines to form semicircular recesses, which when the plates are together constitute a cylindrical chamber for the reception of the axles B, which latter may be either of continuous tubular form or stub-axles, as desired. The axles are clamped firmly between the plates A A, and the latter are riveted together through their abutting portions. The axles proper may also be held in place by transverse rivets, such as indicated at D. To afford additional strength and protection, the flanged upper edges *a* of the axle-plates fit within and are riveted to inverted channel-irons E, and the conformation of said channel-irons and flanges is preferably substantially arched from end to end of the axle, as shown clearly in Figs. 3 and 4, to give additional strength at the center of the axle for supporting the load imposed thereon.

The plates of the front axle are pressed outwardly at the center in a vertical line, as at F, to form a vertical chamber for the reception of the king-bolt, and where a continuous axle B is employed it is centrally perforated for the passage of said king-bolt, as will be readily understood. Thimbles or reinforces may be inserted between the axle-plates around the king-bolt, as shown in my contemporaneous application, Serial No. 303,267, to form wear-surfaces and protect and strengthen the plates themselves.

The king-bolt is attached to or forms a depending portion of a circular plate G, adapted to rest on a similar plate H, secured to the top of the front axle. The axle-plate H is preferably braced by brace-irons H', extending diagonally from the front and rear portions of the plate to the axle-plates A above the axle-chamber, and thence follow closely the contour of said plates to their lower edges, suitable rivets being employed to unite the brace-irons and plates rigidly together.

To the upper surface of the king-bolt plate G are rigidly secured angle-irons I, between the upwardly-extending portions of which is the web of a short T-iron bolster K. The T-iron bolster and upwardly-extending portions of the angle-irons are connected by a fore-and-aft horizontal bolt L, which will permit the T-iron bolster to rock in a vertical plane. Wear-plates I' may be introduced between the angle-irons and T-iron bolster to afford additional bearing-surface where so desired.

Extending from the T-iron bolster of the front axle to the inverted channel-iron of the rear axle are oppositely-arranged longitudinal channel-iron beams M, having their lower flanges rigidly united to the bolster and axle, respectively, and forming with said bolster and axle a rigid framework well adapted for the platform of a gasolene-engine. To secure additional rigidity, the rear ends of the longitudinal channel-irons M are connected with the rear axle by reinforce-pieces N, having their upper ends bolted to the flanges of the longitudinal channel irons or beams, their intermediate portions fitted closely to the outer faces of the axle-plates A and suitably riveted thereto and their lower ends flanged outwardly at N' for the attachment of the rear ends of diagonal braces O. The latter extend forwardly and upwardly to the under side of the longitudinal channel irons or beams and are riveted firmly thereto, as at O'. Additional braces O² extend diagonally from the under sides of the beams M to the axle at points in proximity to the wheels and are attached to said axles by reinforce-irons N², corresponding in construction to the irons N, save that their upper ends do not extend above the axle.

The front axle is braced and strain on the king-bolt relieved without in any way interfering with the freedom of movement of the parts by a diagonal brace P, provided with an eye $p$ at its forward end, through which the lower end of the king-bolt passes and on which it is held by a washer and cotter-pin $p'$. The rear end of the brace P is formed into an eye P'', joined loosely to a transverse brace R, extending between the longitudinal beams M at a point intermediate the axles. This construction of brace for the front axle permits said axle to turn in a horizontal plane or one end or the other of the same to be lifted without tending to strain or distort the platform formed by the beams M, and at the same time the said brace will in all positions effectually prevent the bending of the king-bolt under draft strains.

The tongue S is secured to the front axle by eyebolts S' passing through the plates A A and tubular axle B, whereby the draft strains are received by the axle at a point between the lower end of the brace P and beams M, whereby the said draft strains will be equally distributed between these parts.

Obviously the longitudinal beams M may be additionally braced one from the other by suitable cross-pieces, such as T, or cross-pieces may be introduced wherever found desirable for the attachment of the engine or its fittings, although the upper flanges of said beams M will ordinarily be found to be amply sufficient for the attachment of all of the engine parts. In this connection it will be noted that the said upper flanges of the beams M and the body of said beams above the lower flanges are left entirely free from bolts or rivets or parts relating to the truck itself, and consequently may be utilized to the fullest extent for the attachment of the engine and its fittings.

Any desired form of wheels may be employed on the truck to facilitate transportation, although the metallic wheels shown are preferred, inasmuch as with the employment of metallic wheels practically the entire structure is made of metal and is therefore less liable to be racked and destroyed by vibrations and strains incident to the use of the truck.

Having thus described my invention, what I claim as new, and desire to secure by Letters Patent, is—

1. In a truck for gasolene-engines, the combination with the longitudinal channel-iron beams, the rear axle rigidly connected with said beams and the front axle connected with said beams by a universal-joint connection, of a diagonal brace joined to the center of the front axle at its forward end and joined at its rear end to a transverse brace between the longitudinal beams; substantially as described.

2. In a truck for gasolene-engines, the combination with the longitudinal channel-iron beams and the rear axle rigidly connected with the bottom flanges of said beams, of the front axle, a king-bolt mounted in a vertical bearing in said front axle and having an extended plate at its upper end, angle-irons rigidly connected with said plate, a T-iron bolster rigidly secured to the beams and a horizontal bolt uniting said angle-irons and the web of the T-iron bolster to form a horizontal-joint connection; substantially as described.

3. In a truck for gasolene-engines, the combination with the axles embodying pressed-steel plates having their upper edges flanged outwardly, and an inverted channel-iron embracing and rigidly connected with said flanges, of longitudinal channel-iron beams rigidly connected at their rear ends with the inverted channel-iron of the rear axle and a universal-joint connection interposed between the forward ends of said longitudinal beams and the center of the front axle; substantially as described.

4. In a gasolene-engine truck, the combination with the axles each formed of two plates of sheet-steel centrally recessed for the reception of the axle proper and having their upper edges flanged outwardly, inverted channel-irons overlying and rigidly connected with said flanged edges of the axle-plates and reinforce-irons overlying said axle-plates, of longitudinal beams carried by said reinforce-irons and channel-irons; substantially as described.

5. In a gasolene-engine truck, the combination with the longitudinal iron beams, of an axle embodying pressed-steel plates secured together, reinforce-irons rigidly secured to the lower flanges of the beams and embracing the axle-plates, and diagonal braces secured to the lower ends of said reinforce-irons below the axle and to the lower flanges of the beams at a point remote from the axle; substantially as described.

6. In a gasolene-engine truck, the combination with the longitudinal channel-iron beams and T-iron bolster rigidly secured thereto transversely of said beams, of an axle embodying pressed-steel plates secured together, an extended bearing-plate rigidly mounted on the upper edge of said axle, reinforce-irons embracing the axle-plates and secured to said bearing-plate, a king-bolt passing vertically through said axle between the plates thereof, an extended bearing-plate at the upper end of said king-bolt resting on the bearing-plate of the axle, angle-irons secured to the upper face of the king-bolt plate and a fore-and-aft horizontal bolt uniting the angle-irons and web of the T-iron bolster; substantially as described.

7. In a gasolene-engine truck, the combination with the longitudinal channel-iron beams and T-iron bolster rigidly secured thereto transversely of said beams, of an axle embodying pressed-steel plates secured together, an extended bearing-plate rigidly mounted on the upper edge of said axle, reinforce-irons embracing the axle-plates and secured to said bearing-plate, a king-bolt passing vertically through said axle between the plates thereof, an extended bearing-plate at the upper end of said king-bolt resting on the bearing-plate of the axle, angle-irons secured to the upper face of the king-bolt plate, a fore-and-aft horizontal bolt uniting the angle-irons and web of the T-iron bolster, a diagonal brace jointed at its forward end to the lower end of the king-bolt and jointed at its rear end by a loose connection with the longitudinal beams at a point in rear of the axle; substantially as described.

ADDISON N. CALKINS.

Witnesses:
L. E. EMMONS,
L. E. EMMONS, Jr.